United States Patent [19]

Nakamura

[11] Patent Number: 5,437,047
[45] Date of Patent: Jul. 25, 1995

[54] SYSTEM FOR GATHERING AND SAFEGUARDING PROGRAM RUN INFORMATION OF EACH INDIVIDUAL PROCESSOR BY TRANSFERRING INFORMATION TO AN EXTERNAL STORAGE

[75] Inventor: Kei Nakamura, Kawasaki, Japan

[73] Assignee: Fujitsu Limited, Kawasaki, Japan

[21] Appl. No.: 250,955

[22] Filed: May 27, 1994

Related U.S. Application Data

[63] Continuation of Ser. No. 899,328, Jun. 16, 1992, abandoned.

[30] Foreign Application Priority Data

Jun. 28, 1991 [JP] Japan .................................. 3-158228

[51] Int. Cl.[6] ............................................. G06F 13/00
[52] U.S. Cl. .................................... 395/800; 395/575; 371/13; 371/29.1; 364/228.1; 364/230.5
[58] Field of Search ...................... 395/200, 800, 575; 371/29.1, 13

[56] References Cited

U.S. PATENT DOCUMENTS

| | | | |
|---|---|---|---|
| 4,034,347 | 7/1977 | Probert, Jr. ......................... | 395/200 |
| 4,214,305 | 7/1980 | Tokita et al. ....................... | 395/325 |
| 4,245,306 | 1/1981 | Basemer et al. .................... | 395/325 |
| 4,368,514 | 1/1983 | Persaud et al. ..................... | 395/200 |
| 4,414,624 | 11/1983 | Summer, Jr. et al. .............. | 395/650 |
| 5,099,418 | 3/1992 | Pian et al. ........................... | 395/650 |
| 5,146,589 | 9/1992 | Peet, Jr. et al-083606467 ... | 395/575 |

Primary Examiner—Parshotam S. Lall
Assistant Examiner—Krisna Lim
Attorney, Agent, or Firm—Staas & Halsey

[57] ABSTRACT

A program run information gathering system for a multiprocessor system gathers program run information inclusive of an interrupt masked kernel program from all the processors of the multiprocessor system for evaluation of distribution of program runs in the system, while protecting data as gathered against being lost even upon occurrence of a crash in a processor. The program run information gathering system comprises a non-maskable timer interrupt unit provided in association with each of the processors for generating a non-maskable timer interrupt to the associated processor, a context information gathering unit provided in association with each of the processors for collecting program run information in a shared memory of the multiprocessor system at a time point when the non-maskable timer interrupt is issued by the non-maskable interrupt timer interrupt unit, and a collected data output unit, corresponding to a given one of the processors, for transferring the program run information gathered in the shared memory to an external storage medium for evaluation.

5 Claims, 3 Drawing Sheets

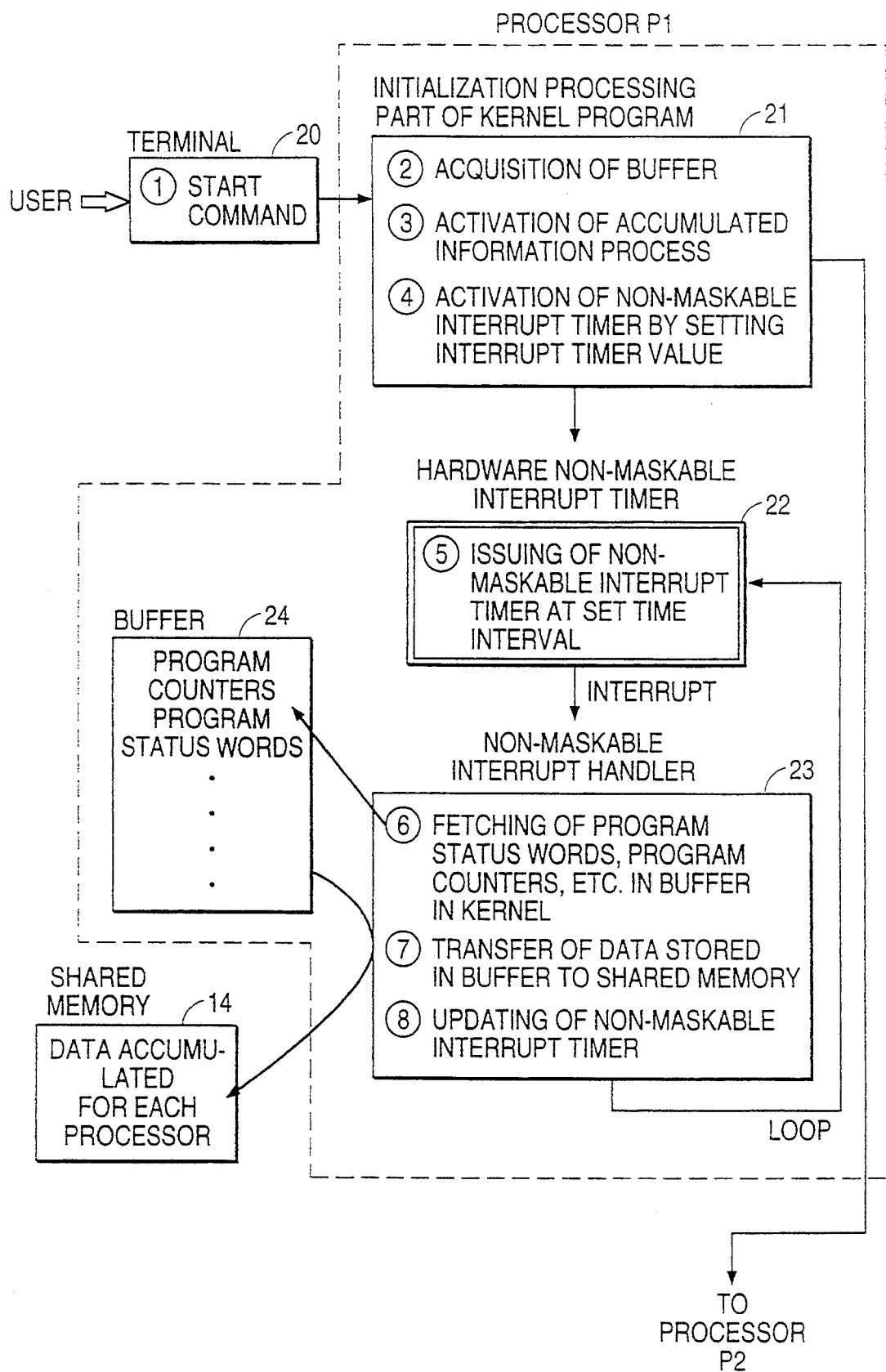

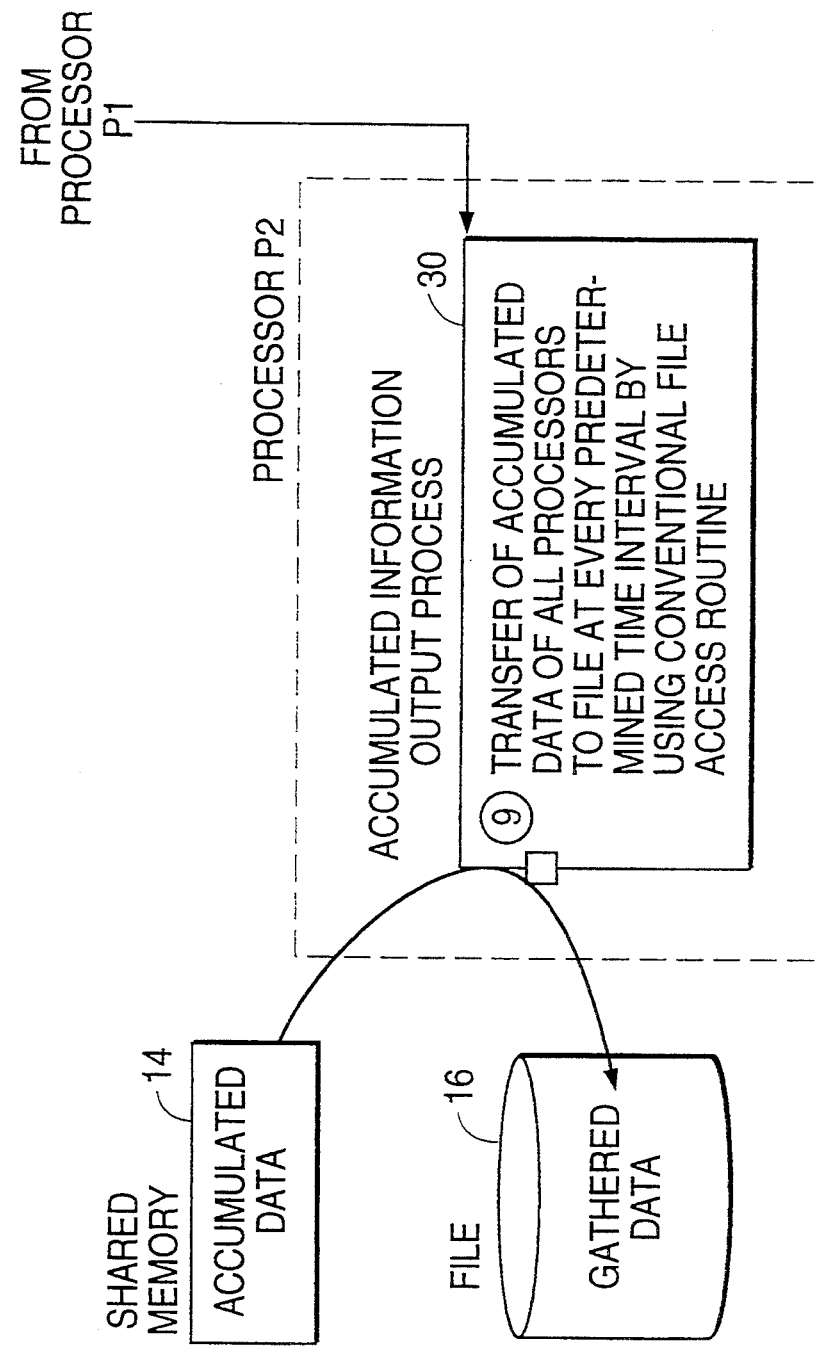

SYSTEM FOR GATHERING AND SAFEGUARDING PROGRAM RUN INFORMATION OF EACH INDIVIDUAL PROCESSOR BY TRANSFERRING INFORMATION TO AN EXTERNAL STORAGE

This application is a continuation of application Ser. No. 07/899,328, filed Jun. 16, 1992, now abandoned.

BACKGROUND OF THE INVENTION

1. Field of the Invention

The present invention relates generally to a program run monitoring system for a multiprocessor system. More particularly, the present invention is concerned with a program run information gathering system capable of gathering or collecting information concerning distribution of program runs in a multiprocessor system.

2. Description of the Prior Art

In recent years, multiprocessor systems, including a plurality of interlinked processors, are increasingly being used in numerous fields of applications. To operate such a multiprocessor system with high efficiency and performance, tasks must be allocated to the individual processors as uniformly as possible (i.e., to distribute the programs run on the individual processors as evenly as possible). Under the circumstances, a demand exists for a technique which allows information about programs, running on the individual processors, to be available accurately and inexpensively.

Heretofore, in the multiprocessor-based computer system, data, for checking or examining distribution of programs running on the individual processors is obtained by collecting context information, such as program status words (PSW), program counters (PC) and instruction codes using a timer interrupt. However, with the presented program run data gathering system, context information can not be obtained from a kernel of an operating system (OS), when the (OS) is operating in an interrupt disabled mode, i.e., the interrupt to the kernel is masked or inhibited. In other words, the prior art technique suffers in that precise information concerning distribution of program runs in the multiprocessor system can not be made available for the whole multiprocessor system inclusive of the (OS) kernel.

Moreover, the multiprocessor system known, heretofore, adopts an arrangement in which each individual processor cumulatively stores information concerning the run of the loaded program in a memory dedicated to each individual processor. Accordingly, when a failure such as crash, for example, takes place in one of the processors, information or data of that processor will volatilize, incurring loss of the data, The loss of data, due to a crash, may be prevented by allowing each individual processors to directly use an external storage medium such as a file as a medium, for cumulatively storing program run information. In that case, however, overhead, for data input/output to the external storage medium will necessarily increase, giving rise to other problems.

SUMMARY OF THE INVENTION

In the light of the state of the art described above, it is an object of the present invention to provide a program run information gathering system for a multiprocessor system which is substantially immune to the difficulties of the prior art system described above and which can gather program run information, for the whole multiplexer system inclusive of an interrupt disabled or masked kernel program, with high reliability.

Another object of the present invention is to provide a program run information gathering system for a multiprocessor system which protects data collected by a processor, from being lost, even when of a crash occurs in that processor, thereby preventing an appreciable decrease in system efficiency or performance.

In view of the above and other objects which will become apparent as description proceeds, there is provided according to an aspect of the present invention a program run information gathering system for a multiprocessor system including a plurality of processors and a shared memory which can be accessed in common by the processors, wherein the program run information gathering system comprises a non-maskable timer interrupt generator provided in association with each of the processors, for generating a non-maskable timer interrupt to the associated processor, a context information collector, provided in association with each of the processors, for fetching program run information of the associated processor and storing the information in the shared memory at a time point when the non-maskable timer interrupt is issued by the non-maskable interrupt timer interrupt unit; and a collected data output transferer provided in association with one of the plural processors, for transferring the program run information stored and gathered in the shared memory to an external storage medium.

With the arrangement of the program run information gathering system according to the invention described above, it is possible to gather periodically, at a predetermined time interval, the program run information, inclusive of that of kernel program from the individual processors constituting a multiprocessor system, for evaluation of distribution of program runs within the system or for the like purpose. Since the program run information of the individual processors is cumulatively stored in a shared memory provided in the multiprocessor system to be accessed by the individual processors independent of one another, the accumulated program run information can be protected against loss even upon occurrence of failure, such as crash, in a processor. Further, because only one of the processors transfers the accumulated program run information to the external storage medium from the shared memory, the performance of the other processors and, hence that of the whole multiprocessor system, is substantially insusceptible to the influence of the accumulated program run information output processing, to another advantage.

These and other objects, advantages and attainments of the present invention will become apparent to those skilled in the art upon a reading of the following detailed description taken in conjunction with the drawings.

BRIEF DESCRIPTION OF THE DRAWINGS

FIG. 2 is a functional diagram illustrating an embodiment of the program run information gathering system according to the present invention.

FIG. 3 is a functional diagram illustrating an embodiment of a second processor of the program run information gathering system according to the present invention.

DESCRIPTION OF THE PREFERRED EMBODIMENTS

Figure 1:
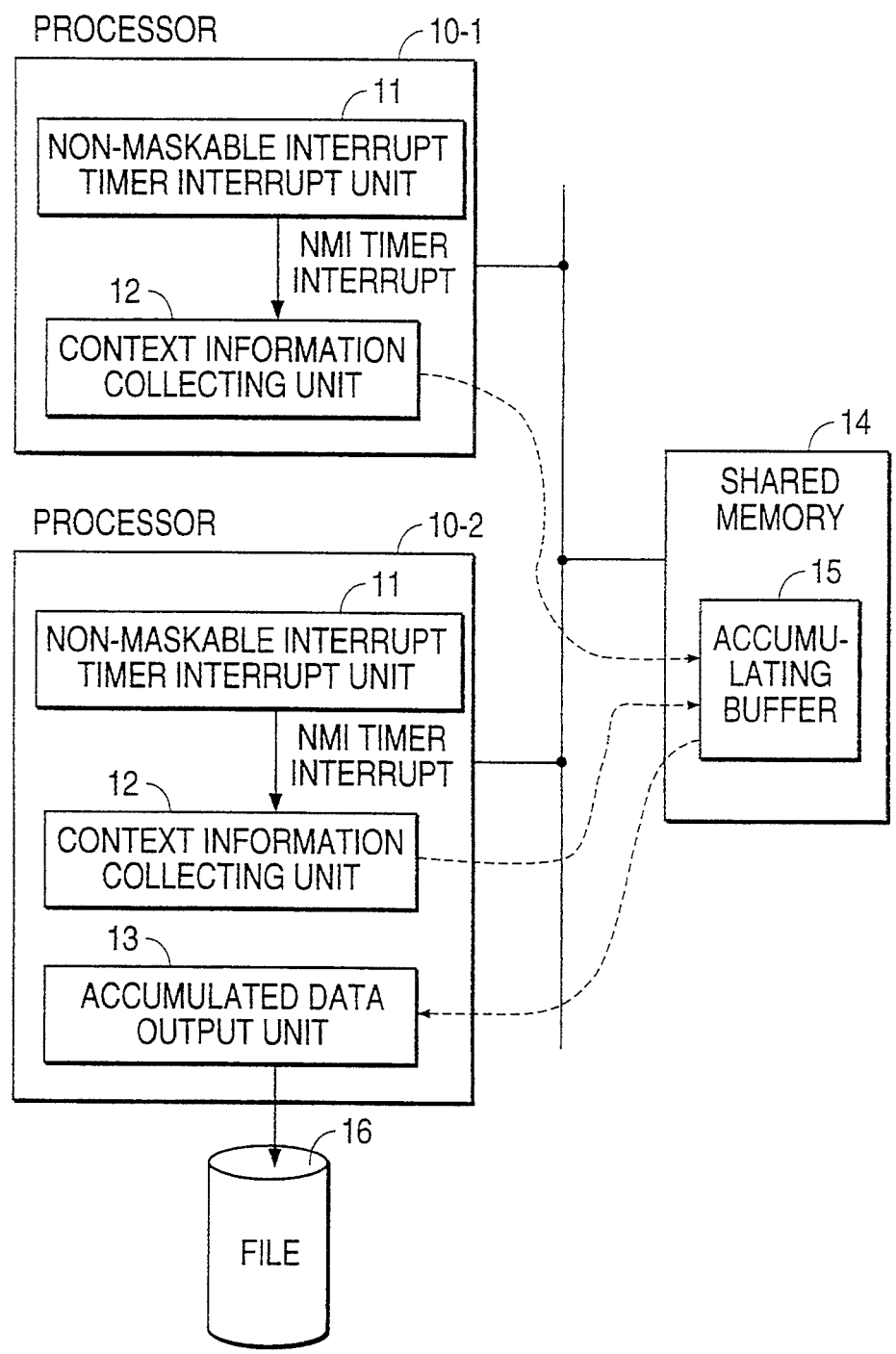
FIG. 1 is a schematic block diagram of the present invention.

Now, the present invention will be described in conjunction with an exemplary or preferred embodiment thereof by reference to the accompanying drawings.

Referring to FIG. 1 which is a view for illustrating the invention, reference numerals 10-1 and 10-2 denote processors, respectively, which constitute main parts of a multiprocessor system. Although only two processors are shown, this is only for the illustrative purpose. It should be understood that the number of the processors incorporated in the multiprocessor system can be selected rather arbitrarily in the broadest sense. Each of the processors 10-1 and 10-2 is provided with a NMI timer interrupt unit 11 which generates a non-maskable timer interrupt (i.e., a timer interrupt which can not be disabled by an interrupt mask and which will hereinafter be referred to as the NMI timer interrupt) periodically at a predetermined time interval. Each of processors also include a context information collecting unit 12 for fetching and storing information concerning the program running state of a program loaded in the associated processor. Further, one of the processors 10-1 and 10-2 (processor 10-2 in the case of the illustrated system) is provided with an accumulated data output unit 13 for outputting or transferring the program run information to a file 16 which serves as an external storage medium. The processor to be provided with the accumulated data output unit may be any one of the plural processors constituting the multiprocessor system. A shared memory 14 is provided in the multiprocessor system. Therefore, all the individual processors may access the shared memory. A store or accumulating buffer 15 for storing, cumulatively, the context information, as output from the individual processors, is secured on the shared memory 14.

Each of the context information collecting facilities 12 may include by a handler program, known pep se in the art, activated by the interrupt issued by the NMI timer interrupt unit 11 and serving to fetch context information such as the program status word (PSW), the program counter (PC) value and the instruction code of the program running on the associated processor for cumulative storage of the collected information in the storage buffer 15.

The accumulated data output unit 13, provided in association with an arbitrarily selected one of the processors (e.g., processor 10-2 in the case of the illustrated embodiment) of the multiprocessor system, is activated whenever the context information, stored cumulatively in the buffer 15 created in the shared memory, 14 has attained a predetermined amount or, alternatively, periodically at a predetermined time interval. This, thereby transfers the context information gathered and stored in the buffer 15 for each of the individual processors to the file 16 which is constituted by a read/write external storage medium such as a magnetic disk memory or the like. The accumulated data output facility 13 can be realized by a conventional process which is under the control of the operating system.

As mentioned previously, the NMI timer interrupt facility 11 implemented by hardware is activated to issue the NMI timer interrupt periodically, at a predetermined time interval, whereby an interrupt handler and hence, a context information fetching handler serving as the context information collecting unit 12 are activated. Since this interrupt can not be masked using software, the interrupt can equally be validated to the kernel of the operating system as well, even when the latter is in the course of running.

Each of the context information collecting unit or handlers 12 which is activated in response to the interrupt issued by the associated NMI timer interrupt facility 11 serves for two functions mentioned below.

(a) A first function for fetching or collecting information concerning the program run on the associated processor such as the program status word, the program counter value and the like, in the kernel at the time point when the interrupt is issued.

(b) A second function for storing the collected information in the shared memory 14. Since this processing is performed by the plurality of processors independent of one another, the processing should be executed through exclusive control. Of course, such exclusive control can be spared when the storage buffer 15 is divided into areas dedicated to the individual processors, respectively.

Since the processings mentioned above are performed by the interrupt handler, it is impossible to make use of the functions of the operating system. However, there will arise no problem, since the processings or functions (a) and (b) mentioned above can be executed without need for resorting to the aid of the operating system.

The accumulated data output facility 13 operates as a process under the control of the operating system to transfer to the file 16 the information gathered cumulatively in the buffer 15 on the shared memory 14 by the context information collecting unit 12. The program run information thus written in the file 16 can be read out therefrom through a conventional read/write interface for evaluation of the efficiency or performance of the multiprocessor system or for the other purposes.

FIGS. 2 and 3 are views which show in combination embodiment of the program run information gathering system according to the invention.

Referring to the figures, reference symbols P1 and P2 denote processors, each of which includes a control processing unit or CPU. The processors P1 and P2 cooperate to constitute a multiprocessor system. Although only two processors P1 and P2 are shown, the multiprocessor system may include three or more processors. A reference numeral 20 denotes a terminal serving for issuing commands or designations to the multiprocessor system; a numeral 21 denotes an initialization processing part of a kernel program; a numeral 22 denotes a hardware NMI timer which corresponds to the NMI timer interrupt unit 11, shown in FIG. 1; a numeral 23 denotes an NMI interrupt handler which corresponds to the context information collecting unit 12, shown in FIG. 1; a numeral 24 denotes a buffer provided in a local memory incorporated in each of the individual processors; and a reference numeral 30 designates an accumulated information output process which corresponds to the accumulated data output unit 13, shown in FIG. 1.

For simplification of the description, it is assumed, in the multiprocessor system constituted by the two processors P1 and P2, that the latter (P2) controls the transfer of the program run information to the file 16. In more general terms, in a multiprocessor system constituted by a plurality of processors, it is possible to select an arbitrary one of the processors as the processor which is to controls the transfer of the program run information to the file 16.

Now, description will be turned to operation of the program run information gathering system. The program run information gathering operation is activated in response to a corresponding activation command input through the terminal 20 by the user, as indicated by an encircled numeral "1" in FIG. 2. The initialization processing part 21 of the kernel program is thereby activated. The initialization part 21 first acquires or reserves a buffed 24 in the kernel, as indicated by encircle numeral "2". Subsequently, the initialization processing part 21 activates the accumulated information output process 30 as shown in FIG. 3 on the processor P2 in a step indicated by encircled numeral 3. Further, through the initialization processing part 21, an NMI timer value for the information collection is placed in a preselected hardware register serving as the NMI timer, whereon the NMI timer operation is started, as indicated by encircled numeral "4". In this conjunction, the value of the time interval at which the program run information is to be fetched or collected may be selected to be, for example, 500 ms. Upon time lapse of 500 ms, the NMI timer 22 issues the NMI timer interrupt as indicated by encircled numeral "5". In response thereto, the NMI interrupt handler 23 is activated to load information, such as the PC, PSW and the like, in the buffer 24 reserved in the kernel, as indicated by encircled numeral "6". When the buffer 24 becomes full, the data stored therein is transferred to the buffer 14 of the shared memory 14 to be stored therein, as indicated by encircled numeral "7". Thereafter, the NMI time is again set, whereupon the system restores itself from the interrupted state as indicated by encircled numeral "8". In succession, the processing steps indicated by encircled numerals "5" to "8" are executed repetitively until an end command is issued.

On the other hand, in the processor P2, as illustrated in FIG. 3, the accumulated information output process 30 is executed periodically at a predetermined time interval to transfer or output, to the file 16, the program run information stored cumulatively in the shared memory 14, for use by all the processors, as indicated by encircled numeral "9". To this end, a conventional file access function provided by the operating system may be utilized.

As will be apparent from the above description, owing to the cumulative storage of the program run information of the processors In the shared memory 14 on a processor-by-processor basis, it is possible to prevent the accumulated data from being lost even when a crash occurs in a processor such as the processor P1. This conjunction, the shared memory 14 should preferably be a nonvolatile memory. Furthermore by using shared memory 14 which is a system memory provided independent of the individual processors, execution of the gathered program run data output processing from the shared memory 14 to the file 16 does not influence on the operations of the individual processors, except for the one processor which incorporates the gathered data output unit 13 (e.g. P2).

Parenthetically, the NMI timer interrupt unit 11 can easily be implemented by hardware by resorting to conventional hardware technique. Accordingly, further description concerning the implementation of the NMI timer interrupt unit will be unnecessary.

As will now be appreciated from the foregoing description, it is possible, according to the teachings of the invention in the illustrated embodiment, to gather periodically, at a predetermined time interval, the program run information, inclusive of that of the kernel, from the individual processors of a multiprocessor system, for evaluating of distribution of program runs in the system or for other purposes. Since the program run information of the individual processors is cumulatively stored in the shared memory provided in the multiprocessor system independent of the individual processors, the accumulated program run information can be protected even upon occurrence of failure such as, crash in the processor. Additionally, because it is only one of the processors which serves for transferring the accumulated program run information to the external storage medium from the shared memory, the performance of the other processors, and hence that of the whole multiprocessor system, is substantially insusceptible to the influence of the accumulated program run information output processing another advantage.

Many features and advantages of the present invention are apparent from the detailed specification and thus it is intended by the appended claims to cover all such features and advantages of the system which fall within the true spirit and scope of the invention. Further, since numerous modifications and changes will readily occur to those skilled in the art, it is not intended to limit the invention to the exact construction and operation illustrated and described.

I claim:

1. A multiprocessor system comprising:
 a common memory;
 a plurality of processors which share said common memory, each said processor having a local memory, said plurality of processors comprising:
 a plurality of timer interrupt means respectively associated with said plurality of processors, each for generating, at predetermined time intervals, non-maskable timer interrupt to said corresponding processor, and
 a plurality of context information collecting means, each respective context information collecting means of said context information collecting means corresponding to one of said processors, for receiving program run information, including information concerning distribution of programs running on individual processors of said plurality of processors, in response to said non-maskable timer interrupt and for transferring said program run information, of the corresponding processor, to said shared common memory in response to said non-maskable timer interrupt when said respective context information means has attainted a selected amount,
 one of said processors comprising accumulated data output means corresponding to the one of said plurality of processors, for supplying said transferred program run information, from said shared common memory, to an external storage medium for protecting said transferred program run information from being lost.

2. A multiprocessor system according to claim 1, wherein said program run information transferred by said context information collecting means is stored in a storage buffer in said shared common memory, on a processor-by-processor basis.

3. A multiprocessor system according to claim 1, wherein said context information collecting means further comprises a temporary buffer defined in the local memory of the corresponding processor, and a non-maskable interrupt handler which transfers program run information from the corresponding processor in response to said non-maskable interrupt generated by said timer interrupt means and thereby stores the program run information in said temporary buffer, said program run information being transferred from said temporary buffer to said storage buffer whenever said temporary buffer becomes full.

4. A program run information gathering system according to claim 1, wherein said program run information contains at least a program status word and a program counter value.

5. A program run information gathering system according to claim 1, wherein said shared memory is a non-volatile memory.

* * * * *